US006648183B2

(12) United States Patent
Nybakke

(10) Patent No.: US 6,648,183 B2
(45) Date of Patent: Nov. 18, 2003

(54) CAP FOR A BEVERAGE SERVER

(75) Inventor: Keith G. Nybakke, Minneapolis, MN (US)

(73) Assignee: Service Ideas, Inc., Woodbury, MN (US)

( * ) Notice: Subject to any disclaimer, the term of this patent is extended or adjusted under 35 U.S.C. 154(b) by 33 days.

(21) Appl. No.: 10/075,516

(22) Filed: Feb. 13, 2002

(65) Prior Publication Data

US 2003/0150886 A1 Aug. 14, 2003

(51) Int. Cl.$^7$ ................................. B67D 3/00
(52) U.S. Cl. .............. 222/472; 222/509; 222/518; 222/482
(58) Field of Search ............... 222/472, 509, 222/518, 482

(56) References Cited

U.S. PATENT DOCUMENTS

| | | | | |
|---|---|---|---|---|
| 4,648,535 A | * | 3/1987 | Zimmermann | 222/472 |
| 4,676,411 A | * | 6/1987 | Simasaki | 222/472 |
| 5,037,015 A | * | 8/1991 | Collins | 222/472 |
| 5,497,917 A | | 3/1996 | Krimmel et al. | |
| 5,615,808 A | * | 4/1997 | Huang | 222/518 |
| 5,988,457 A | * | 11/1999 | Andrew et al. | 222/518 |
| 6,269,984 B1 | * | 8/2001 | Murakami | 222/472 |
| 6,427,880 B1 | * | 8/2002 | Hirose et al. | 222/518 |

* cited by examiner

*Primary Examiner*—Kenneth Bomberg
(74) *Attorney, Agent, or Firm*—Moore, Hansen & Sumner

(57) ABSTRACT

The present invention provides a cap having a plurality of readily assembled parts that provide a passage for a beverage or liquid through the cap from the pitcher to the exterior thereof. The cap has a cap body made up of top and bottom portions that are formed so as to snap fit together. The cap body defines an interior cavity or passage from an entry defined by the bottom portion to an exit cooperatively defined by the top and bottom portions. The entry is selectively opened and closed to allow fluid or liquid passage through the cap by a valve that is biased into a closed position. In a preferred embodiment the valve is attached to a plunger having a cylindrical configuration and including a plurality of upwardly and outwardly extending shape memory retentive legs that are confined within a receiving collar attached to the bottom portion. The plunger is moved downwardly from its closed position through the interaction of the plunger with a ring closely and slidably surrounding the receiving collar, the ring being attached to a user accessible push button. The ring further comprises a cantilevered frame having a distal end that defines an axis of rotation for the ring.

10 Claims, 5 Drawing Sheets

CAP FOR A BEVERAGE SERVER

FIELD OF THE INVENTION

The present invention relates to beverage servers in general and to an improved cap of the pour-through type that is easily cleanable and self-closing to prevent accidental spillage in particular.

BACKGROUND OF THE PRESENT INVENTION

Beverage servers are a common commodity of the restaurant industry as well as being widely found in the home, the work place and institutional settings, such as hospitals. Typically, beverage servers include a pitcher for containing a beverage and a cap that is attached thereto in some manner and that is removable to allow filling of the pitcher. At times they may be so constructed as to allow pouring of the liquid through the cap and from the pitcher. Often the pitcher will have a.double walled construction that includes an insulating material to keep the contained beverage hot or cold as desired.

One problem with many prior art beverage servers is that beverages can be easily spilled from them. Thus, if a beverage.server is upset, the cap can open and allow the beverage to spill out. This spillage wastes not only the beverage but can also directly cause injuries if a hot beverage is spilled onto a person. Indirect injuries may occur to people due to their attempts at avoiding the spilling beverage or later slipping and falling if the beverage should spill onto the floor. In either case, the prepared food merchandiser faces potential economic losses whenever a spill occurs due to payment of damages for any injuries as well as the loss of business because of unhappy customers. The dangers related to an unsealed server and spills therefrom in the restaurant industry are also applicable to their use in the home, the work place, or the institutional setting. While devices that provide a sealed container are presently being sold, such as beverage servers having a screw-on cap, they are often difficult for certain segments of the population to use, such as the elderly or individuals who have a loss of hand flexibility or strength and are therefore not acceptable for use generally. Additionally, because of the time involved in sealing and unsealing the caps, they are not practical or economical to use in a busy environment such as a restaurant where it is more desirable to have waiters dispensing prompt service to the waiting customer than spending time sealing and unsealing server caps. Another problem with these types of caps is that they are usually unable to be readily disassembled for cleaning and then reassembled quickly for use. Cleaning of these prior art caps is oftentimes difficult, thereby compromising the sanitation of the beverage server and creating the potential for unsightly filth or grime to accumulate within the view of the customer or other beverage recipient.

Another problem associated with certain beverage servers is one referred to as "vapor lock". This occurs where pressure built up in the interior of the server acts to keep the cap of the server closed, thereby preventing one from pouring beverages from the server. This is typically due to play in the mechanism for actuating the valve that controls the flow of beverages from the server.

Finally, known prior art caps require the cap to be removed prior to filling the pitcher, which can result in further time delays for busy waiters and which can also lead to spills.

It would be desirable, therefore, to have a beverage server having a cap capable of sealing onto the pitcher to prevent accidental spills that is simple to use, that requires a minimum of hand strength and flexibility, a minimum of time to use, that is readily disassembled and reassembled for improved cleaning and increased sanitation, and/or that would reliably enable the user of the beverage server to fill the same without removal of the cap therefrom.

SUMMARY OF THE INVENTION

It is an object of the present invention to provide new and improved apparatus that is not subject to the foregoing disadvantages.

It is another object of the present invention to provide an improved cap for a beverage server that includes a push-button activated valve to open and close a passage through the cap to allow beverages to be selectively poured from the server.

It is still another object of the present invention to provide an improved cap that comprises parts or components that are readily attached to each other such that the cap is capable of being readily assembled or disassembled for cleaning.

It is yet another object of the present invention to provide a cap for a beverage server than enables the user to fill the beverage server without removing the cap from the pitcher.

It is still yet another object of the present invention to provide a beverage server cap that is made from synthetic materials and includes a plurality of shape memory retentive legs that act as biasing means to bias a valve opening and closing a passage within the cap into a closed position to prevent accidental spillage of a liquid from the beverage server.

Another object of the present invention is to provide an improved beverage server cap that reliably actuates the valve for opening and closing a passage within the cap along which beverages exit the server.

The foregoing objects of the present invention are provided by a cap having a plurality of readily assembled parts that provide a passage for a beverage or liquid through the cap from the pitcher to the exterior thereof. The cap has a cap body made up of top and bottom portions that are constructed of a synthetic material in preferred embodiment and are formed so as to snap fit together, the top and bottom portions including lugs and corresponding mating, interlocking recesses. The cap body defines an interior cavity or passage from an entry defined by.the bottom portion to an exit cooperatively defined by the top and bottom portions. The entry is selectively opened and closed to allow fluid or liquid passage through the cap by a valve that is biased into a closed position. In a preferred embodiment the valve is attached to a plunger having a cylindrical configuration and including a plurality of upwardly and outwardly extending shape memory retentive legs that are confined within a receiving collar attached to the bottom portion. The plunger is movable between open and closed positions wherein the attached valve respectively opens and closes the entry of the internal cap passage so as to selectively allow liquid to flow through the passage. The plunger is moved downwardly from its closed position through the interaction of the plunger with a ring closely and slidably surrounding the receiving collar, the ring being attached to a user accessible push button. The ring also has extending therefrom opposite the user accessible push-button a cantilevered frame having a distal end that defines an axis of rotation for the ring. Therefore, the ring is moved from a first position in which the valve is closed and a second position in which the valve is open along a curvilinear path that approximates linear motion.

In operation, as the push button is depressed downwardly, the attached ring presses downwardly on the plunger, forcing it downwardly within the receiving collar and thus opening the entry to the internal passage. This downward motion of the plunger in turn causes the outwardly extending shape memory retentive legs to bear against the inside of the receiving collar and forces the legs to bend inwardly within the perimeter of the collar. As the legs are forced inwardly, a biasing force is created within the legs to return the plunger to its rest or valve closed position. Releasing the push-button allows the legs to exert their biasing force and return to their naturally disposed outward position. That is, the legs, in their efforts to return to their natural outwardly extending positions, bear against the collar upper edge and leverage the plunger upwardly such that the valve seats and closes the entry to the passage, thereby stopping the flow of liquid therethrough.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
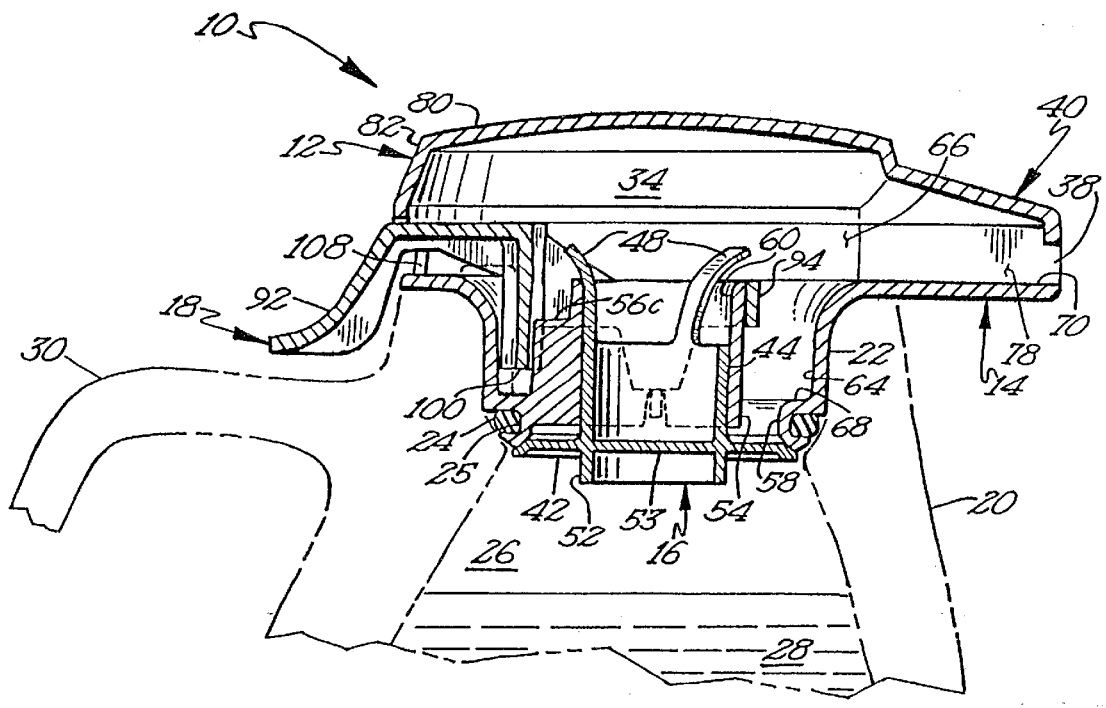
FIG. 1 is a side elevation cross-sectional view of a beverage server cap in accordance with the present invention wherein the cap is shown disposed relative to a pitcher shown in phantom outline and wherein the valve is shown in a closed position.

Referring now principally to FIGS. 1–4, the present invention will be described. A cap 10 according to the present invention includes top and bottom portions 12 and 14 forming a cap body, a plunger 16, and a push button 18, the individual elements just named being best seen in the exploded perspective view of FIG. 4. Cap 10 is shown disposed on a pitcher 20 that is shown in phantom outline in FIGS. 1–3. Cap 10 may be constructed to be removably attached to pitcher 20 in any known manner, including the use of screw-type threads disposed on cap 10 in an appropriate location, such as the exterior surface 22 of bottom portion 14. Cap 10 may include a flexible sealing member 24 disposed within an appropriately configured seal recess 25 encircling the bottom portion 14 so as to provide a liquid-tight seal between the cap 10 and the pitcher 20 when the two are joined to each other. Pitcher 20 will include an interior volume 26 for holding a liquid 28 and will also include a handle 30. The cap 10 will be received within the neck at the top of pitcher 20 against which cap exterior surface 22 abuts and will close the neck so as to prevent liquid 28 from exiting the pitcher unless activated by the user so as to allow liquid to flow through the cap 10 from the pitcher 20.

Cap top and bottom portions 12 and 14 cooperate to define an internal cavity or flow passage 34 from an entry 36 in bottom portion 14 to an exit 38 cooperatively defined by the top and bottom portions. That is, the top and bottom portions 12 and 14 cooperate to form a pouring spout 40 through which liquid 28 flows. Thus, in a manner to be more fully explained hence, a user of the beverage server shown in the Figures can selectively open entry 36 so as to allow liquid 28 to flow from interior volume 26 through the internal cavity or flow passage 34 and out of exit 38 into an appropriate receptacle, such as a glass or cup.

Figure 2:
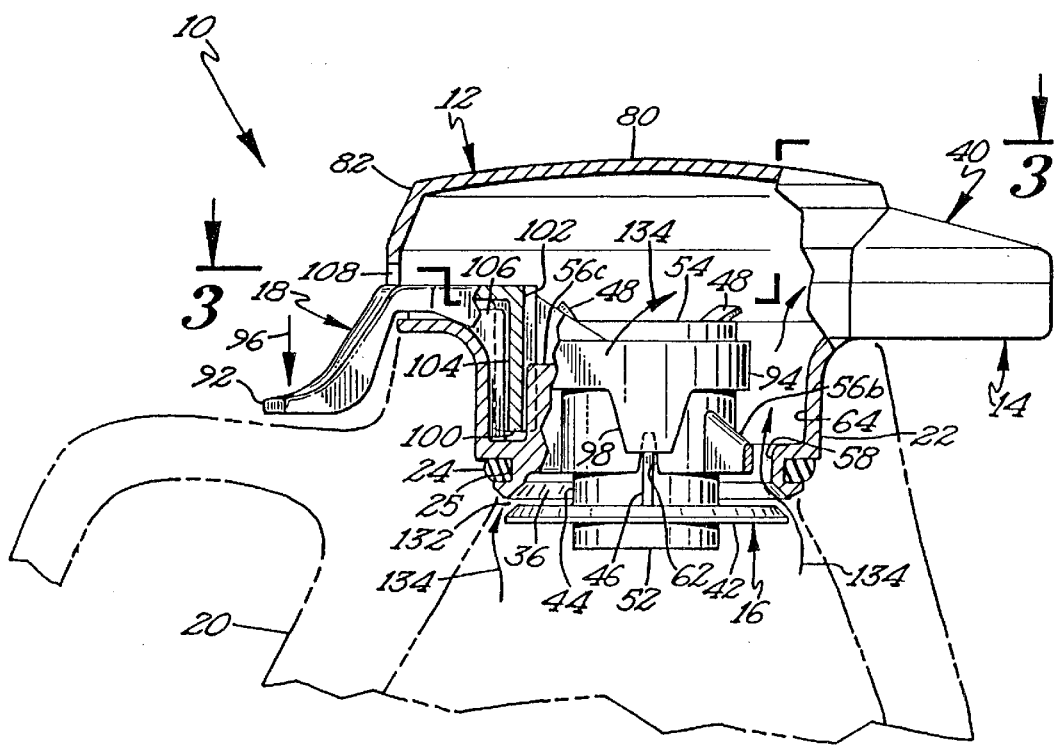
FIG. 2 is a side elevation, partial cross sectional view of the cap shown in FIG. 1 and shows the valve in an open position for pouring liquids from the pitcher.
Figure 4:
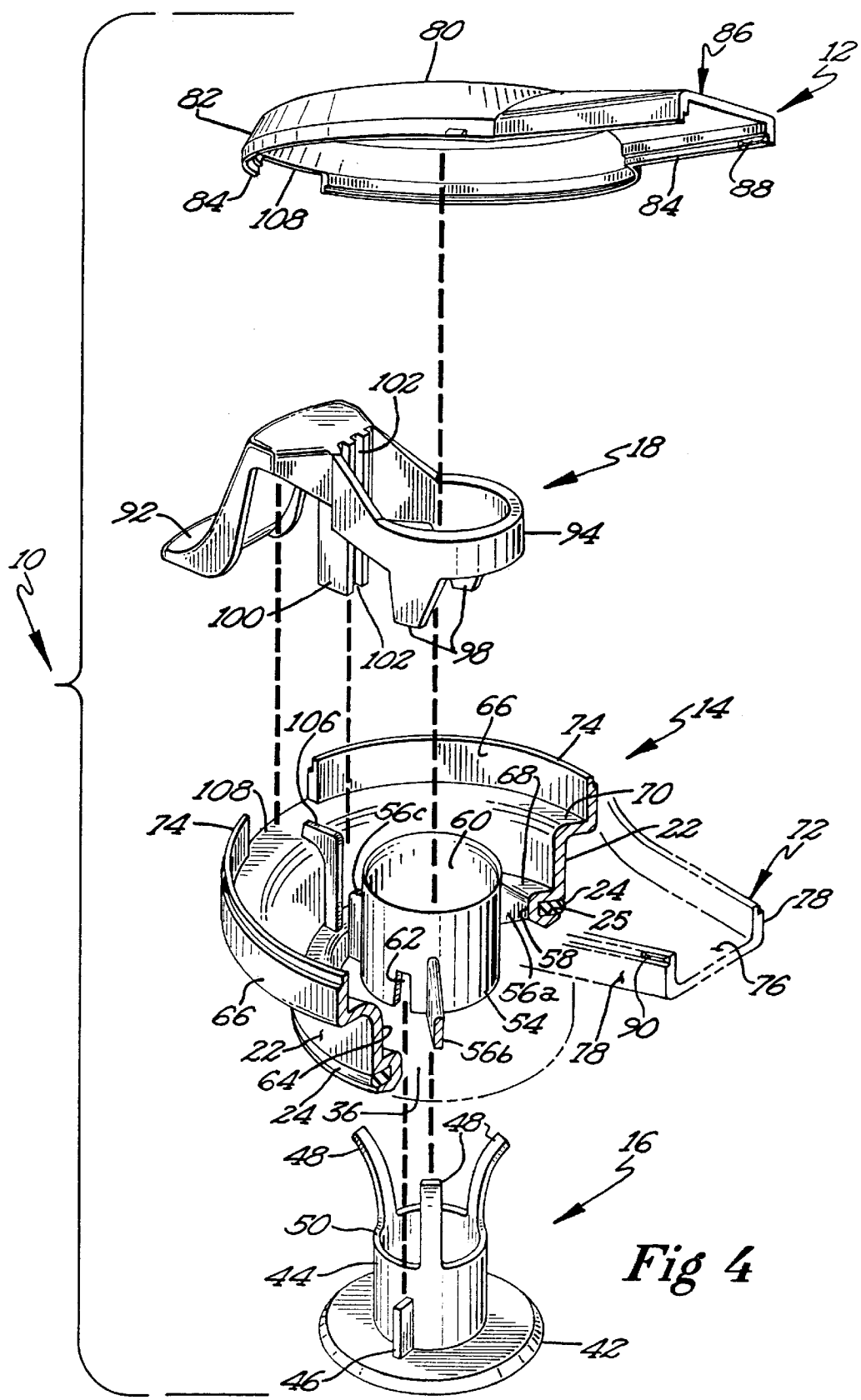
FIG. 4 is an exploded perspective view of the cap shown in FIG. 1
Figure 3:
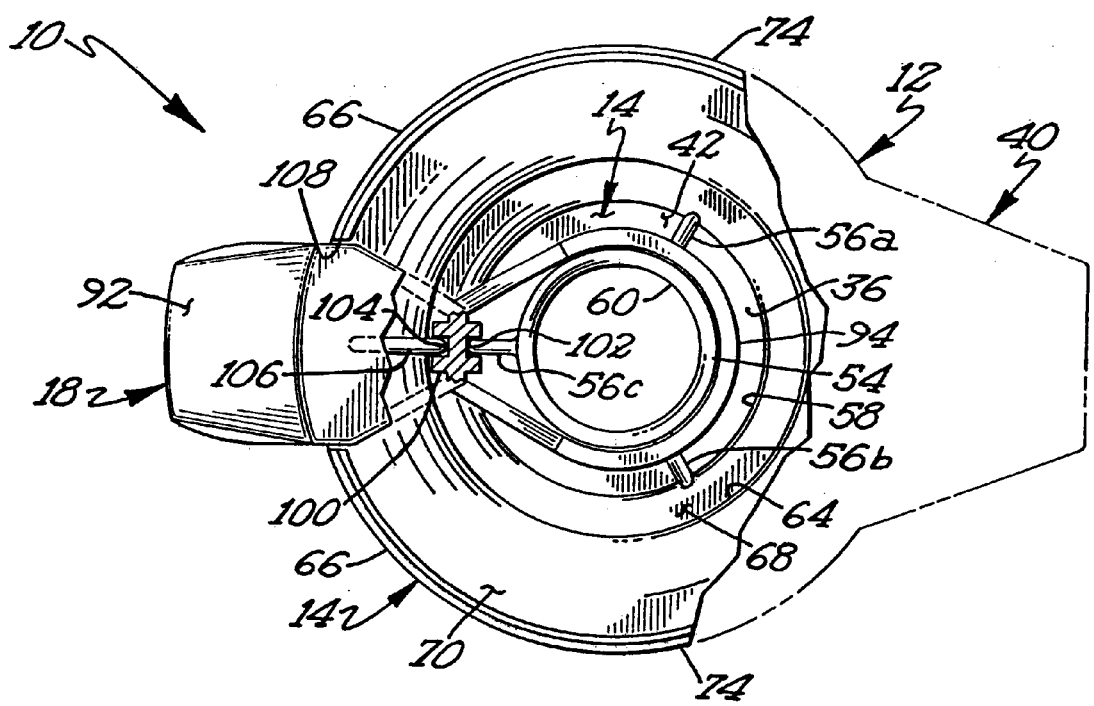
FIG. 3 is a top elevation view of the cap shown in FIG. 1 taken along viewing plane 3—3 of FIG. 2.

Entry 36 is selectively opened and closed by a valve 42 that is attached to a cylindrical plunger wall 44 of plunger 16. A plurality of plunger guide tabs 46 extend outwardly from the cylindrical plunger wall 44 above valve 42. As shown in the Figures a pair of oppositely disposed guide tabs 46 are illustrated. A plurality, as shown, three, of shape memory retentive legs 48 extend upwardly and curvingly outward from the top 50 of cylindrical plunger wall 44. As best seen in FIGS. 1–3, plunger 16 may also, if desired, include a lower cylindrical wall 52 depending downwardly from valve 42, though such a wall is not required for the embodiment shown in FIGS. 1–4. It will be seen that plunger 16 is preferably manufactured from a single synthetic material and that valve 42 is a solid barrier against the passage of any liquid either into or out of the pitcher 20 when the valve is closed. That is, cylindrical plunger wall 44 is open at the top but closed at the bottom by a center portion 53 so as to prevent liquid from passing into the cap 10 unless the valve 42 is opened. Plunger 16 is slidable in an up and down or top to bottom direction relative to the cap body. This sliding motion causes the valve 42 to selectively open and close the entry 36.

Bottom portion 14 includes a centrally disposed collar 54 having a substantially cylindrical configuration. Collar 54 is supported by a plurality of support ribs 56a, 56b, and 56c extending inwardly from a wall 58 forming part of bottom portion 14. Collar 54 is sized and configured to slidably receive plunger cylindrical wall 44 of plunger 16. When assembling the plunger 16 with the bottom portion 14, the legs 48 must be forced inwardly from their outwardly extending rest positions so as to fit within the collar 54. The plunger 16 can then be slid into the collar from the bottom thereof until the legs emerge from the top thereof and return to their rest positions as shown in FIG. 1. In this manner, the inherent elasticity of the legs, that is their tendency to bend outwardly and thus present a circumference that exceeds that of the interior passage 60 formed within collar 54 and to thereby prevent the plunger from moving downwardly within the collar, tends to hold the plunger in the position shown in FIG. 1 so that valve 42 closes entry 36. Collar 54 includes a plurality of collar guide slots 62 configured to receive plunger guide tabs 46. Collar guide slots 62 and plunger guide tabs 46 cooperate to guide the up and down movement of the plunger 16 within the collar 54 and to constrain any tendency of the plunger 16 to rotate within the collar 54. Preventing rotation of the plunger 16 prevents the upwardly extending legs 48 from interfering with the push button 18 to be described further below.

It will be noted that bottom portion 14 includes a plurality of substantially concentric, upwardly extending walls 58, 64 and 66. The walls 58 and 64 are interconnected by a transversely or horizontally extending floor 68 while walls 64 and 66 are interconnected by a transversely or horizontally extending floor 70. Upwardly extending walls 58 and 64 are substantially circular in configuration and have progressively greater diameters. Upwardly extending wall 66 also has a substantially circular configuration of a larger diameter than wall 64, though a portion of wall 66 is broken away to form the laterally extending lower spout section 72 of the spout 40, which as previously noted may be cooperatively formed by top and bottom portions 12 and 14. The top most bottom portion wall 66 includes a bottom portion flange 74 extending upwardly therefrom. Lower spout section 72 of spout 40 is defined by a substantially horizontally extending floor 70 over which liquid will flow when being poured from the pitcher 20 as well as a pair of spaced apart but convergent side walls 78. Convergent walls 78 blend into the uppermost circular wall 66.

Top portion 12 includes a ceiling 80 and a downwardly depending wall 82. A top portion flange 84 extends downwardly from top portion wall 82. As shown, bottom portion flange 74 extends upwardly from the inner side of the wall 66 and top portion flange 84 extends downwardly from the outer side of the top portion wall 82, though these could be reversed in orientation if desired. As shown, however, the bottom portion flange 74 is configured to be snugly received by and closely engage top portion flange 84. Top portion 12 includes an upper spout section 86 configured to extend over the lower spout section 72.

To facilitate disassembly of cap 10 for cleaning, top and bottom portions 12 and 14 are constructed so as to "snap fit" to each other. That is, the portions 12 and 14 include lugs 88 and corresponding recesses 90 that receive the lugs 88. As seen FIG. 4, the lugs 88 are selectively disposed around and project outwardly from the upwardly extending bottom portion flange 74. The corresponding recesses into which the lugs extend and interlock to hold the top and bottom portions 12 and 14 together are disposed within the downwardly extending top portion flange 84, though this disposition could be reversed or the lugs 88 and recesses 90 could be alternated around the flanges 74 and 84.

To activate the valve 42 push button 18 may be conveniently utilized. Push button 18 includes a thumb or finger rest 92 upon which the user can rest a digit when not activating the valve 42. The push button 18 further includes a means for activating the plunger 16 and hence valve 42 that comprises a ring 94 configured to slidably encircle collar 54. Ring 94 engages the plunger guide tabs 46. Thus, exerting a downward force on the rest 92 as indicated by arrow 96 will cause ring 94 to move downwardly toward the guide tabs 46, thereby causing the ring 94 to force the guide tabs and thus the plunger 16 from its upper, rest position shown in FIG. 1 to its lower open position shown in FIG. 2, wherein attached valve 42 is unseated and is moved from its closed position shown in FIG. 1 to its open position shown in FIG. 2, which in turn allows liquid to flow through the cap 10. To facilitate the engagement of ring 94 with plunger guide tabs 46, ring 94 may have a corresponding number of downwardly depending members 98 that engage the plunger guide tabs 46. The ring 94 and hence push button 18 is biased into its upper or rest position shown in FIG. 1 by the engagement of the members 98 with the guide tabs 46. It will be recalled that the elasticity of the legs 48 in turn biases the plunger 16 into its rest position as shown in FIG. 1.

Push button 18 further includes means for guiding its up and down motions and restraining rotation. Thus, push button 18 includes a post 100 that extends downwardly from the junction of the rest 92 and the ring 94. Post 100 includes inner and outer guide slots 102 and 104 respectively therein. Inner guide slot 102 slidably receives rib 56c, which acts as a guide on the inner side of post 100. Outer guide slot 104 slidably receives a post guide 106, which is attached to intermediate wall 64 of bottom portion 14 opposite spout 40. Thus, rib 56c, which is also opposite spout 40, and post guide 106 act to guide the up and down motion of the push button 18 as well as to restrain it from rotating. It will be noted that the top and bottom portions 12 and 14 cooperate to define a push button opening 108 in which push button 18 is seated.

Figure 5:
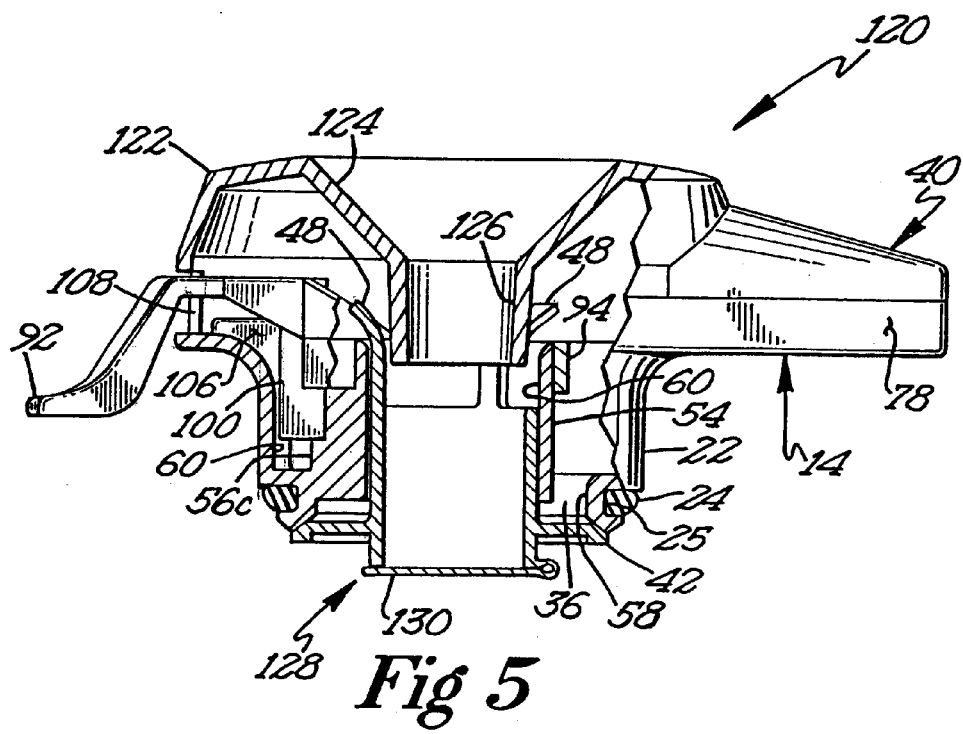
FIG. 5 is a side elevation, partial cross sectional view of an alternative embodiment of a beverage server cap in accordance with the present invention wherein the embodiment shown in the Figure enables the user to fill the beverage server through the cap without removal of it from the pitcher prior to filling.

An alternative embodiment 120 of a cap in accord with the present invention is shown in FIG. 5. Cap 120 is similar to cap 10 except that it incorporates a "brew-through" or "fill-through" function that allows the pitcher 20 to be filled with a liquid without first removing the cap 10 therefrom. Thus, cap 10 includes a top portion 122 having a funnel shaped opening 124 in which a spigot or spout can be received. The lower end 126 of the funnel shaped opening 124 extends downwardly so as to end within collar interior passage 60 of collar 54. Cap 120 includes a plunger 128 that is substantially similar to plunger 16 except that center portion 53 has been eliminated and replaced with a valve 130 hingably attached to the lower wall 52. Valve 130 may be heat staked to the lower cylindrical wall 52 or attached in any known manner. Valve 130 is biased into a closed position as shown but will open under the weight of liquid flowing into the pitcher 20 through the funnel shaped opening 124, thereby allowing the pitcher 20 to be conveniently, efficiently, and quickly filled without first removing cap 120 from the pitcher 20. In all other respects, cap 120 and cap 10 are similar.

Stated otherwise, the cap 120 shown in FIG. 5 includes a cap body having top and bottom portions 122 and 14 respectively. The top portion 122 includes a funnel shaped opening 124 that forms the entryway into an internally disposed filler conduit. The filler conduit has a conduit opening that is selectively closed and opened by a conduit valve 130.

In operation, then, the user will exert a downward force on rest 92 as indicated by arrow 96. This downward force will be transmitted to the plunger 16 by the interaction and engagement of the members 98 and the plunger guide tabs 46. The plunger 16 will be forced downwardly within the receiving collar 54, carrying with it the valve 42. This downward motion of the valve 42 thus opens the entry 36 to the internal passage or cavity 34 and enables liquid to flow into the cap 10 (through the gap 132 which is opened between the valve 42 and the bottom portion 14) and out through spout 40 as indicated by arrows 134. This downward motion of the plunger 16 in turn causes the outwardly extending shape memory retentive legs 48 to bear against the inside of the receiving collar 54 and forces, the legs 48 to bend inwardly within the perimeter of the collar. As the legs 48 are forced inwardly by this downward motion of the plunger 16, a biasing force is created within the legs to return the plunger to its rest or valve closed position. To cease liquid flow the push-button 18 is released, which allows the legs 48 to exert their biasing force and return to their naturally disposed outward position. Thus, the legs 48, in their efforts to return to their natural outwardly extending positions, bear against the collar upper edge and leverage the plunger 16 upwardly such that the valve seats and closes the entry 36 to the passage, thereby stopping the flow of liquid therethrough. The interaction and engagement of the members 98 and the plunger guide tabs 46 causes the push button 18 to be returned to its rest position shown in FIG. 1 as the plunger guide tabs are carried upward by the leveraging action of the legs 48.

Caps 10 and 120 are preferably formed from thermoplastic materials, making the components easily and readily assembled and cleanable. These caps can also be readily sized to retrofit existing pitcher lids that do not currently provide the benefits that caps according to the present invention do.

Figure 6:
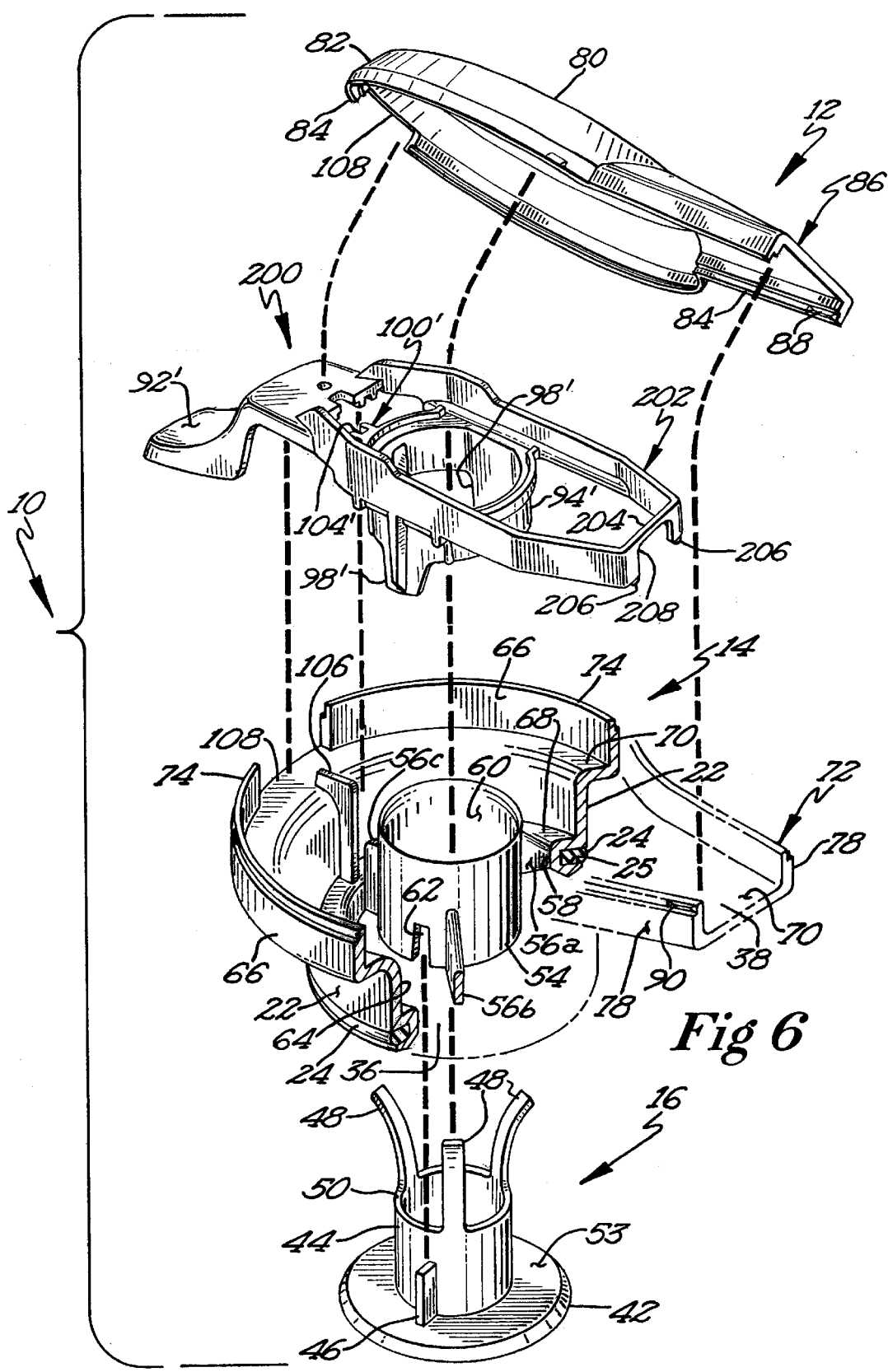
FIG. 6 is an exploded perspective view of a beverage server cap having a cantilevered frame in accordance with the present invention.
Figure 7:
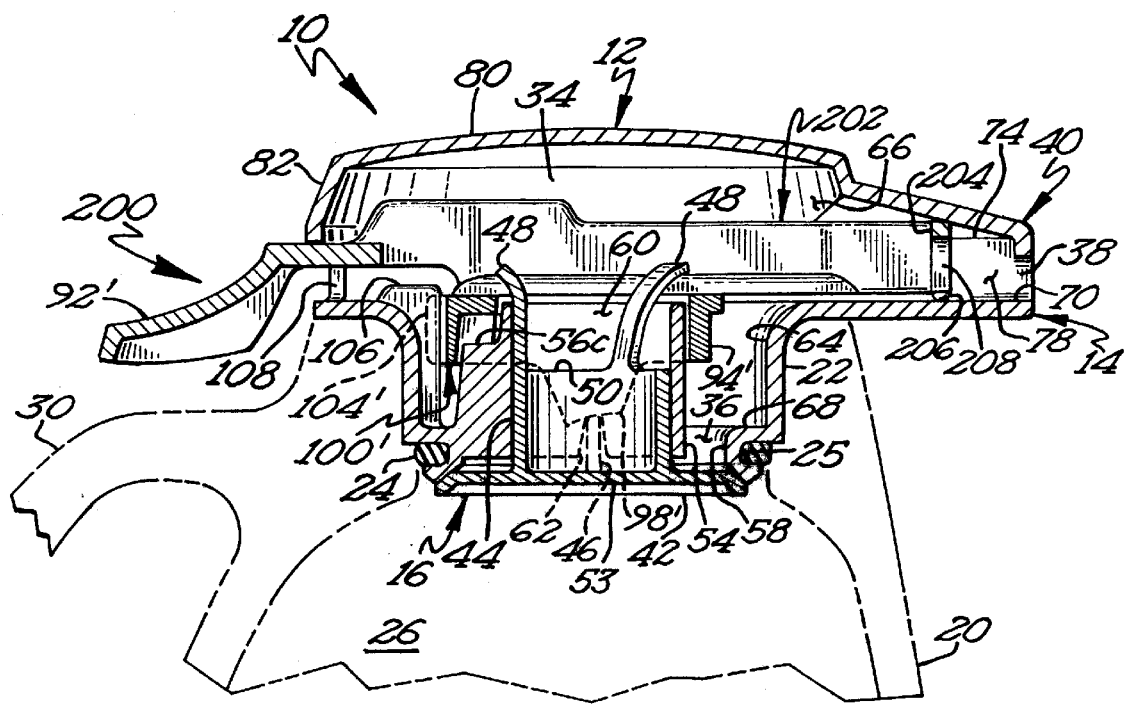
FIG. 7 is a side elevation cross-sectional view of cap of FIG. 6 wherein the cap is shown disposed relative to a pitcher shown in phantom outline and wherein the valve is shown in a closed position; and, FIG. 8 is a side elevation, partial cross sectional view of the cap shown in FIG. 7 and shows the valve in an open position for pouring liquids from the pitcher.
Figure 8:
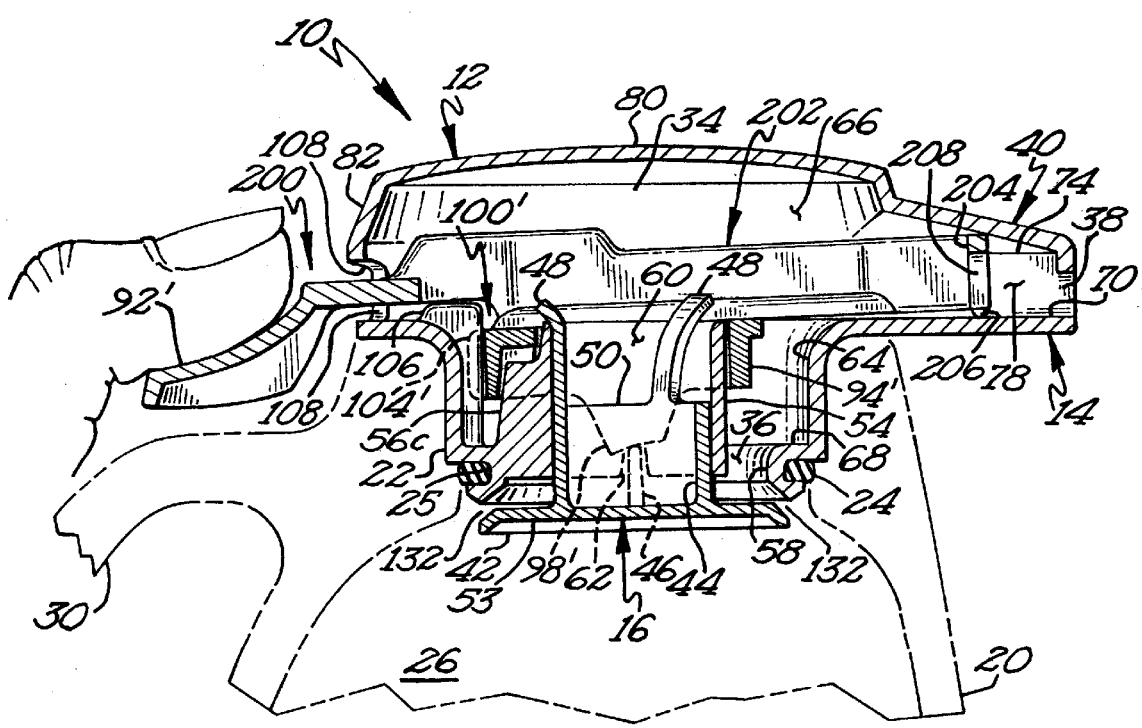

A preferred embodiment of the present invention includes a push-button 200. This embodiment of the cap 10' is best seen in the exploded view of FIG. 6. Cap 10' and pushbutton 200 are not dissimilar in structure to cap 10 and push-button 18 described above in combination with FIGS. 1–5. Like push-button 18, push-button 200 includes a thumb or finger rest 92' upon which the user can rest a digit when not activating the valve 42. The push button 200 further includes a means for activating the plunger 16 and hence valve 42 that comprises a ring 94' configured to slidably encircle collar 54. Ring 94' engages the plunger guide tabs 46. Thus, exerting a downward force on the rest 92' as indicated by arrow 96' will cause ring 94' to move downwardly toward the guide tabs 46, thereby causing the ring 94' to force the guide tabs and thus the plunger 16 from its upper, rest position shown in FIG. 7 to its lower open position shown in FIG. 8, wherein attached valve 42 is unseated and is moved from its closed position shown in FIG. 7 to its open position shown in FIG. 8, which in turn allows liquid to flow through the cap 10'. To facilitate the engagement of ring 94, with plunger guide tabs 46, ring 94' may have a corresponding number of downwardly depending members 98' that engage the plunger guide tabs 46. The ring 94' and hence push button 200 is biased into its upper or rest position shown in FIG. 7 by the engagement of the members 98' with the guide tabs 46. It will be recalled that the elasticity of the legs 48 in turn biases the plunger 16 into its rest position as shown in FIGS. 1 and 7.

Push button 200 further includes means for guiding its up and down motions and controlling rotation. Thus, push button 200 includes a post 100' that extends downwardly along the outer surface of the ring 94' opposite the rest 92'. Post 100' includes an outer guide slot 104'. Outer guide slot 104' slidably receives a post guide 106, which is attached to intermediate wall 64 of bottom portion 14 opposite spout 40. Post guide 106 acts to guide the up and down motion of the push button 200 as well as to control its rotation. It will be noted that the top and bottom portions 12 and 14 cooperate to define a push button opening 108 in which push button 200 is seated.

Push-button 200 further includes a cantilevered frame 202 that extends from ring 94' opposite finger rest 92'. The frame 202 is constructed and arranged such that the push-button 200 is supported upon the distal end 204 of the frame 202 and the downwardly depending members 98'. The thumb rest 92' is simultaneously biased upward into contact with the push-button opening 108. Given this arrangement, as the thumb rest 92' is moved downward, as when a beverage is to be dispensed, the push button 200 will rotate downward about the distal end 204 of the frame 202 such that the downwardly depending members 98' will engage plunger guide tabs 46 and open valve 42. The length of the frame 202 is such that while the ring 94' is in fact rotating about the distal end 204 of the frame 202, the up and down motion of the ring 94' approximates linear motion.

The distal end 204 of frame 202 is preferably provided with casters 206 that support the distal end 204 of frame 202 above floor 70. The distal end 204 of frame 202 is also preferably relieved as by cut out 208 to facilitate the flow of liquids past the frame 202.

By constraining the push-button 200 to rotate about the distal end of 204 of the frame 202, the path of travel of the downwardly depending members 98 is more closely controlled. The guiding means comprised of guide slots 102' and 104' are, in this embodiment, constructed and arranged to permit sufficient rotation to allow the operation of the push-button 200 as described. Consequently, the motion of the thumb rest 92' from its upper position in which valve 42 is closed (FIG. 7), to a lower position in which the valve 42 is opened (FIG. 8) reliably allows beverages to be poured from the pitcher 20 and avoids the problems of vapor lock.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A cap for removable attachment to a pitcher, the pitcher having an interior volume for holding a liquid, said cap comprising:

a cap body defining an interior cavity, said cap body including an entry for the liquid into said cavity and an exit therefrom, wherein liquid held within the pitcher enters the interior cavity through said entry and is poured from the pitcher through said exit;

a valve, said valve being operatively positioned to move between open and closed positions to open and close said entry to selectively allow liquid to flow into said interior cavity;

a plunger attached to said valve, said plunger including a substantially cylindrical side wall;

biasing means for biasing said plunger and said attached valve into a closed position to prevent accidental spillage of the liquid;

said cap body comprising top and bottom portions, said bottom portion defining said entry and including collar means for slidably receiving said plunger, whereby said plunger is slidable between upper and lower positions in which said valve respectively closes and open said entry;

wherein said plunger includes a plurality of guide tabs disposed substantially equidistantly about the exterior surface of said cylindrical side wall and said collar includes guide slots to receive the guide tabs and guide the upward and downward sliding of the plunger; and, means for activating said plunger to move said valve between said open and closed positions, said means comprising a ring encircling said collar and being rotatably slidable relative thereto, said ring have extending therefrom a cantilevered frame having a distal end about which the ring rotates, said ring engaging said plunger guide tabs, whereby moving said ring toward said guide tabs causes said ring to engage said guide tabs and move said plunger from said upper position to said lower position wherein said valve moves from said closed to said open position.

2. The cap of claim 1 wherein said ring includes a pair of downwardly depending members, said ring members engaging said plunger guide tabs.

3. The cap of claim 1 and further including a push button for activation by the user, said push button being attached to said ring and movable in a generally up and down direction.

4. The cap of claim 3 wherein said push button is received between said top and bottom portions.

5. The cap of claim 4 wherein said bottom portion includes a pair of push button guide tabs spaced radially apart from each other and said push button includes a push button post depending downwardly, said post including a pair of guide slots configured to receive said guide tabs, said post being disposed between said guide slots.

6. The cap of claim 1 wherein said bottom portion includes a pair of push button guide tabs spaced radially apart from each other and said push button includes a button post depending downwardly, said post including at least one guide slot configured to receive at least one of said guide tabs.

7. The cap of claim 1 wherein said push button includes a finger rest extending outwardly and downwardly from said cap, said finger rest being configured to seat a user's finger or thumb for downward movement of said push button to open and close said valve and selectively allow liquid flow through said cap.

8. The cap of claim 1 wherein said distal end of said cantilevered frame is supported upon and rotates about at least one caster.

9. The cap of claim 1 wherein said distal end of said cantilevered frame further comprises a cut out portion to facilitate the flow of liquids past said distal end of said cantilevered frame.

10. The cap of claim 1 wherein the length of cantilevered frame is such that further comprises a cut out portion to facilitate the flow of liquids past said distal end of said cantilevered frame.

* * * * *